US008389879B2

(12) United States Patent  (10) Patent No.: US 8,389,879 B2
Kolb et al.  (45) Date of Patent: Mar. 5, 2013

(54) DETECTION DEVICE AND METHOD FOR DETECTING OCCUPANCY OF A SEAT USING A LIGHT GUIDE FORCE SENSOR

(75) Inventors: Jens Kolb, Koenigstein (DE); Roland Uebelacker, Pfreimd (DE); Stefan Mueller, Ursensollen (DE); Juergen Meier, Nuremberg (DE)

(73) Assignee: Grammer AG, Amberg (DE)

( * ) Notice: Subject to any disclaimer, the term of this patent is extended or adjusted under 35 U.S.C. 154(b) by 355 days.

(21) Appl. No.: 12/753,692

(22) Filed: Apr. 2, 2010

(65) Prior Publication Data

US 2010/0276211 A1    Nov. 4, 2010

(30) Foreign Application Priority Data

Apr. 2, 2009 (DE) .......................... 10 2009 015 998
Mar. 25, 2010 (DE) .......................... 10 2010 012 853

(51) Int. Cl.
| B60R 21/015 | (2006.01) |
| B60N 2/00 | (2006.01) |
| G01M 11/02 | (2006.01) |
| G01L 1/00 | (2006.01) |
| G01L 1/24 | (2006.01) |
| G01V 8/10 | (2006.01) |
| G01G 19/08 | (2006.01) |
| G01G 21/00 | (2006.01) |

(52) U.S. Cl. ................... 177/136; 177/144; 177/DIG. 6; 180/273; 280/735; 73/800; 385/15; 250/227.16; 296/68.1; 297/217.2; 340/667

(58) Field of Classification Search .................. 177/136, 177/144, DIG. 6; 180/273; 280/735; 73/800; 340/667; 296/68.1; 297/217.2; 385/13; 250/227.16; 701/45

See application file for complete search history.

(56) References Cited

U.S. PATENT DOCUMENTS

| 4,294,513 A * | 10/1981 | Nelson et al. ..................... 385/4 |
| 4,342,907 A * | 8/1982 | Macedo et al. .......... 250/227.14 |
| 4,560,016 A * | 12/1985 | Ibanez et al. .............. 177/210 R |
| 4,781,056 A * | 11/1988 | Noel et al. ...................... 73/800 |
| 6,040,532 A * | 3/2000 | Munch .......................... 177/144 |
| 6,353,394 B1 * | 3/2002 | Maeda et al. .................. 340/667 |
| 6,920,256 B2 * | 7/2005 | Murad et al. .................... 385/12 |
| 6,998,599 B2 * | 2/2006 | Lagakos et al. .......... 250/227.16 |
| 7,043,997 B2 * | 5/2006 | Mattson et al. ................. 73/800 |
| 7,162,111 B2 * | 1/2007 | Baur et al. ..................... 385/13 |
| 7,630,591 B2 * | 12/2009 | Allen et al. ..................... 385/12 |
| 7,860,625 B2 * | 12/2010 | Jaramillo et al. .............. 701/45 |
| 7,890,234 B1 * | 2/2011 | Jaramillo et al. .............. 701/45 |

(Continued)

FOREIGN PATENT DOCUMENTS

| DE | 19751677 | 5/1999 |
| DE | 19826287 | 12/1999 |

(Continued)

*Primary Examiner* — Randy W Gibson
(74) *Attorney, Agent, or Firm* — Lowe Graham Jones PLLC

(57) ABSTRACT

To allow more reliable detection of occupancy of a seat by a person, the invention includes a detection device for detecting occupancy of a seat, in particular of a vehicle seat or motor vehicle seat, comprising at least one elongate light guide having at least one elongate core element and at least one elongate sheath at a distance from the core element. The light guide is deformable by mechanical actuation means in at least one direction running perpendicular to the longitudinal axis of the light guide by the deformation brought about by the seat being occupied causes the light to exit from the light guide on the side opposite the mechanical means.

10 Claims, 6 Drawing Sheets

U.S. PATENT DOCUMENTS

| | | |
|---|---|---|
| 8,200,050 B2 * | 6/2012 | Foster et al. .................. 385/13 |
| 2009/0267392 A1 | 10/2009 | Himmelhuber et al. |
| 2009/0273484 A1 | 11/2009 | Kolb et al. |

FOREIGN PATENT DOCUMENTS

| | | |
|---|---|---|
| DE | 10007014 | 10/2001 |
| DE | 10239761 | 3/2004 |
| DE | 10320287 | 12/2004 |
| DE | 102004024691 | 2/2006 |
| DE | 102004024891 | 2/2006 |
| DE | 102006017774 | 10/2007 |
| DE | 102006042673 | 3/2008 |
| EP | 1498703 | 1/2005 |

* cited by examiner

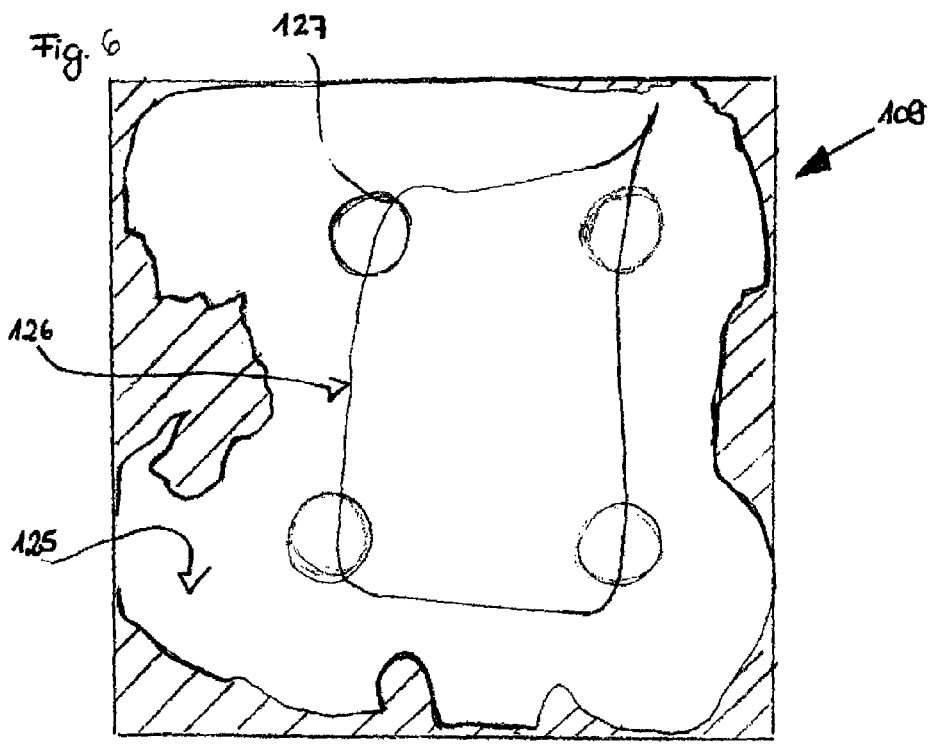
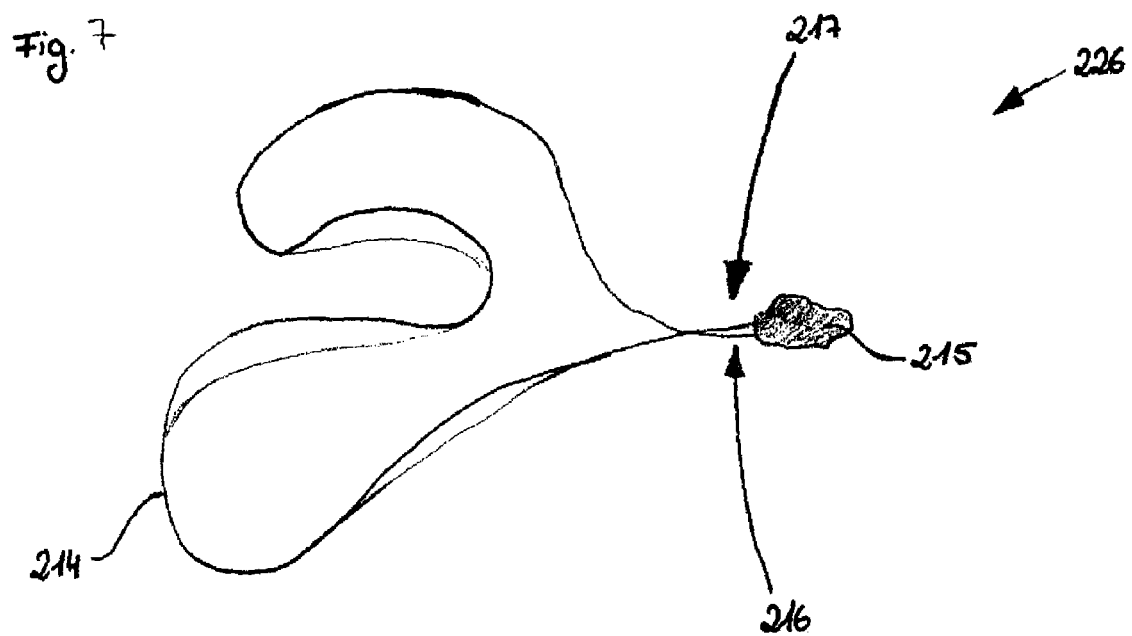

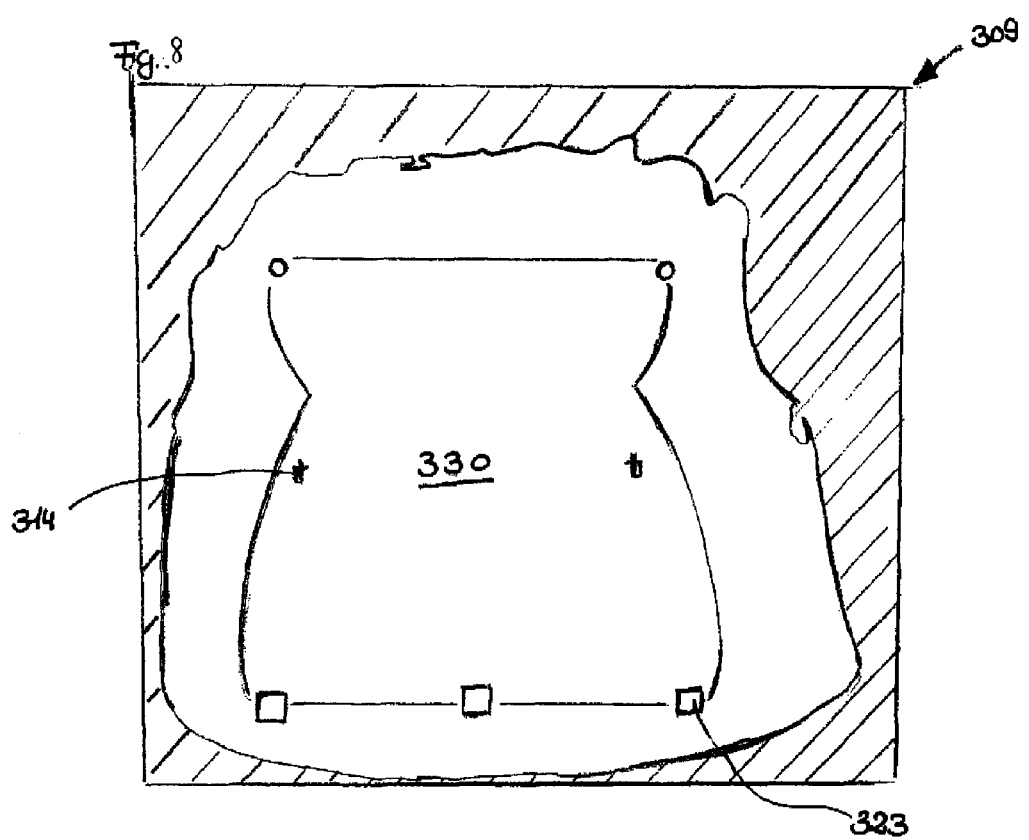

DETECTION DEVICE AND METHOD FOR DETECTING OCCUPANCY OF A SEAT USING A LIGHT GUIDE FORCE SENSOR

PRIORITY CLAIM

This application claims the benefit of German Application Serial No. 10 2009 015 998.3 filed on Apr. 2, 2009 and German Application Serial No. 10 2010 012 853.8 filed on Mar. 25, 2010, contents of which are incorporated herein.

FIELD OF THE INVENTION

The invention relates to a detection device and a method for detecting occupancy of a seat, in particular of a vehicle seat or motor vehicle seat.

BACKGROUND OF THE INVENTION

Particularly in the motor vehicle industry, generic seats are often already used to reliably detect whether a person has sat on the seat so as to be able to control optimally, for example, functions of airbags. There is a need for an improved detection device and a method for detecting seat occupancy of a vehicle seat.

SUMMARY OF THE INVENTION

The invention is directed to a detection device and a method for detecting occupancy of a seat, in particular of a vehicle seat or motor vehicle seat, comprising at least one elongate light guide which is provided with at least one elongate core element and at least one elongate sheath at a distance from the core element. The light guide is deformable by mechanical actuation in at least one direction running perpendicular to the longitudinal axis of the light guide by the deformation which is brought about by the seat being occupied, which causes the light to exit from the light guide on the side opposite the mechanical actuation.

In a preferred embodiment, the present invention provides a device and a method for detecting occupancy of the seat, namely, whether a person has sat on the seat part, in which the detection device on the seat part optically detects occupancy of the seat by a person, for example, using a light guide. Since at least one light guide is provided directly on the seat part, a particularly reliable detection of seat occupancy is always ensured, so that the risk of malfunctions can be considerably reduced. A reliable detection of seat occupancy may in some circumstances even be vital if a control or adjustment of safety-related devices depends on a clear and reliable detection of seat occupancy.

The term "seat" encompasses here any seat devices on which persons can sit. By way of example, such a seat may also be used in an aircraft. Preferably, however, the present seat is used in the form of a vehicle seat or a motor vehicle seat in land vehicles. The seat moreover always has a seat part, on which a person can sit directly. Preferably, the seat also comprises a backrest, against which the person can lean, so that said person is securely held by the seat.

It will be understood that the means for optical detection comprises, in addition to the light guide, which can be embodied in various ways on the seat part of the seat, also inter alia a transmitting and receiving device.

By means of the deformable light guide, the optical properties can be varied or modulated in a particularly simple manner in structural terms, wherein the degree of variation of the optical properties can be used as a sign that the seat is or is not occupied.

Furthermore, in the present case, it is possible to determine in a structurally very simple and reliable manner, by means of the light guide, whether a device for detecting occupancy of the seat by a person is or is not defective. Such a defect may exist, for example, due to a broken line for conducting electromagnetic waves from a corresponding detection device. If, however, as in the present case, optical means are used to detect seat occupancy, such as a deformable light guide, it is advantageously possible to determine directly whether such a deformable light guide is or is not broken. In the event of a break, no further light can be passed through the light guide and accordingly also cannot be detected at the outlet of the light guide. However, if the deformable light guide is not broken, but rather is only bent or kinked, always at least a residual quantity of light still reaches the outlet of the deformable light guide. As soon as such a residual quantity of light can be detected at the outlet side, it can be assumed that the means for optically detecting seat occupancy are intact. This is a significant advantage over conventional methods known from the prior art. The present light guides can thus also be used as means for checking a detection device for detecting occupancy of a seat by a person.

Ideally, the deformable light guide comprises one or more optical fibres as core elements, by means of which electromagnetic waves, preferably visible light, can be passed through the deformable light guide. Such a core element may be for example a step index fibre, which is particularly inexpensive.

By way of example, a core element of such a light guide is spaced apart from a sheath which surrounds the core element, wherein the resulting volume, for example, is under vacuum, and is acted upon by a protective gas, preferably nitrogen or argon, in order to minimize the material stress due to reactive oxygen molecules, or is filled with air. Light coupled into the inlet side of the deformable light guide passes along inside the core element of the light guide ideally according to the principle of total reflection to an outlet of the core element of the deformable light guide, at which it can be detected. If the light guide is deformed, for example by bending, to a sufficiently great extent due to the seat being occupied by a person, there is a critical drop below a necessary limit angle for this total reflection, and at least some of the light within the deformable light guide is not reflected in such a way that it can reach the outlet of the deformable light guide. If the detectable light drops below a predefined threshold value, it is advantageously possible to deduce that the seat is occupied by a person. The optical detection means can thus be provided in a particularly simple manner in design terms.

Furthermore, if the deformable light guide is deformed to a sufficiently great extent due to the seat being occupied by a person, the distance between the sheath and the core element also continuously reduces due to a physical change in the environment, preferably brought about by mechanical actuation means, until ultimately direct contact is achieved. This contact causes absorption of the energy of the reflected light, thereby reducing the signal intensity at the outlet of the light guide. Such absorption may in particular take place as a result of the fact that, in the case of total reflection at the interface of the core element, an electromagnetic near-field is formed behind this interface. When the light guide is deformed, this near-field is overlapped by the molecules of the sheath, which then become scattering centres for the near-field, which has until then been static, and can accordingly absorb energy which is constantly drawn from the light in the core element.

If the detectable light drops below a predefined threshold value, it is advantageously possible to deduce that the seat is occupied by a person. This predefined threshold value of the detectable light may be selected for example in such a way that it is coupled to a corresponding weight of a person who has sat on the seat. If, for example, a child having a body weight of 30 kg sits on the driver's seat, the intensity of the detected light will be weakened compared to an unloaded seat, but will nevertheless be higher than if an adult had sat on the seat. If there is no drop below the predefined threshold value, the on-board electronics as a whole can also remain disabled, i.e. the child cannot start the vehicle. Furthermore, it is also conceivable that there is preferably a time-dependence of the drop below the predefined threshold value. For instance, in order to activate the on-board electronics, it is necessary for the light constantly to fall below the predefined threshold value for a relatively long period of time. This ensures that even a child at play jumping on the seat cannot inadvertently start the vehicle.

Furthermore, it is also possible that such an optical fibre is embedded within a flexible sheath of a deformable light guide in such a way that the optical fibre is in contact with the flexible sheath only at a few support points in the normal state, that is to say in an unoccupied state of a seat part. In this case, almost all of the light coupled into the inlet side of the deformable light guide can be detected at the outlet side of the deformable light guide. However, if the deformable light guide is deformed by a person on the seat part, the optical fibre can come into contact with the flexible sheath at many contact points or over a relatively large surface area, as a result of which the light coupled into the inlet side can be coupled out of the optical fibre. As a result, the light previously coupled in can no longer be detected in full at the outlet side, but rather can be detected only to an attenuated degree. Such an attenuated light detected at the outlet side can advantageously be used as an indication of the load acting on a seat part. Occupancy of the seat can thus reliably be detected as a result.

A coupling of the light out of the core element is preferably achieved when the light rays passing through the light guide impinge on a medium transition or on interfaces between two media at a smaller angle than the limit angle of total reflection. In this case there are the three interface situations fibre→air, fibre→fibre sheath and fibre→fibre jacket. For each of these described interface transitions, there is in each case an individual limit angle of total reflection, which depend primarily on the optical refractive indices of the different media adjoining the interfaces, in particular at the transition from an optically denser to an optically thinner medium.

Such a coupling-out at a smaller angle than the limit angle of total reflection can advantageously be used when it is difficult to position an optical fibre in the seat surface without this already touching its fibre sheath in a state of non-occupancy of the seat surface.

The invention also discloses a method for detecting occupancy of a seat, in particular of a vehicle seat or motor vehicle seat, in which it can be detected whether a person has sat on a seat part of the seat, wherein occupancy of the seat by a person is detected optically due to the fact that light passed through a light guide is modulated in the region of the seat part.

A suitable modulation can in the present case also advantageously be achieved, for example, if modes are scattered within the above-described deformable light guide in such a way that these can no longer contribute to a main intensity of the light at the outlet side.

Besides a dispersion or pulse widening of the light passed through the deformable light guide, a light intensity still achieved at the end of the deformable light guide can thus also be used as an indication of non-occupancy of a seat, occupancy of the seat by a person and/or a defect of the light guide.

By means of such a modulation, therefore, it is possible to detect reliably and advantageously particularly quickly whether a person has sat on the seat part of the seat. Particularly when a light coupled in at the inlet side drops below a critical threshold value at the outlet side, it is particularly easy to deduce that the seat is occupied by a person.

Furthermore, for excellent detection, it may already be sufficient if three detection ranges are provided. For example, a first threshold value for non-occupancy of the seat is set, for instance based on a minimum intensity of a dispersion of the light. Above a predefined maximum intensity of the dispersion of the light, the seat is deemed to be occupied by a person. As already described above, a defect can easily be recognized by the fact that it is no longer possible for any light to be detected.

Preferably, the means for optically detecting seat occupancy are initialized prior to delivery, so that advantageously an individual critical threshold value can be defined. This is because only when the deformable light guide is positioned in a serpentine manner on or in the seat part is it possible to distinguish at the inlet side and at the outlet side of the deformable light guide the light passed through the deformable light guide. It is thus advantageous if appropriate threshold values can finally be measured, calibrated and stored during a manufacturing process if a basic attenuation of the light intensity due to installation, positioning and pre-loading of the deformable light guide is to be taken into account.

One preferred method variant provides that the light is coupled into at least one optical fibre of a deformable light guide of the seat part, wherein, in the event of the seat being occupied, some of the light coupled in is not reflected sufficiently well within the deformable light guide and/or is coupled out of the at least one optical fibre. If at least some of the light coupled in is coupled out of the at least one optical fibre within the deformable light guide, a corresponding seat occupancy can be detected optically in a particular simple and reliable manner with regard to the method.

The light coupled into the deformable light guide at the inlet side can be detected only insufficiently at the outlet side if for example there is a drop below a limit angle for total reflection within the deformable light guide. In the present case, the light guide can be used and operated with particular advantage according to the principle of such total reflection.

In a further advantageous embodiment, actual occupancy of the seat by a person can also be detected with extreme certainty and can optionally also be reliably distinguished from a different seat occupancy, for example occupancy by a bag or the like. In this case, it is advantageous if, in order to couple some of the light out of the at least one optical fibre, the light guide is deformed, preferably bent or kinked, multiple times. Particularly if the deformable light guide is bent or kinked ideally multiple times, an actual occupancy of the seat part by a person can be detected in a particularly reliable manner. Especially by means of a multiple bending or kinking of the deformable light guide, it can be guaranteed that a limit angle for total reflection within the deformable light guide will be undershot, as already described above, and/or the at least one optical fibre is in contact with the flexible sheath of the deformable guide at multiple points and thus overall also over a sufficiently large surface area and, as a result, the light coupled in can also be coupled out of the at least one optical fibre to a sufficiently great extent, so that a critical threshold value can be reliably undershot at the outlet side.

In this connection, one particularly advantageous method variant provides that, in order to detect occupancy of the seat, a difference value between a light quantity and/or a light quality at an inlet of the deformable light guide and an outlet of the deformable light guide is determined.

By way of example, seat occupancy by a person can advantageously be detected on the basis of the fact that only some of the light coupled in at the inlet side can be detected at the outlet side of the deformable light guide, wherein conclusions about the seat occupancy can be drawn from the determined difference in terms of light quantity.

In addition or as an alternative, in order to ensure a reliable detection of corresponding seat occupancy, the light quality can also be determined at the outlet side. By way of example, a certain frequency or wavelength spectrum is coupled out by means of suitable deformation of the light guide, so that said spectrum can no longer be detected at the outlet side of the deformable light guide.

It will be understood that the present detection device may comprise a suitable device for determining such a difference value and/or for monitoring a corresponding critical threshold value.

Furthermore, it is advantageous that such light guides are preferably arranged at least partially in cushion material cut-outs on the seat underside of the seat cushion. At the same time this enables the light guide to be appropriately positioned to cover in a flexible manner also the points of main stress of the seat surface, preferably the side surface of the seat. In order to be able to reliably determine at the outlet side of the deformable light guide, in the event of seat occupancy by a person, other values concerning the light coupled in at the inlet side, it is advantageous if the detection device moreover comprises means for modulating an optical conductivity of the light guide.

In this connection, it is advantageous if the detection device comprises means for mechanically actuating the light guide, in particular means for deforming the light guide. Such mechanical actuation means and/or deformation means may advantageously assist or increase a deformation or bending or kinking of the deformable light guide in a structurally simple manner. Even relatively light persons on the seat part of the seat can thus be detected.

One preferred variant embodiment provides that the mechanical actuation means and/or the deformation means preferably have raised areas which face towards the light guide. By way of example, deformable light guides can be sufficiently well bent by means of the raised areas, by moving the deformable light guide through the seat cushion towards the mechanical actuation means while the seat is occupied or by pushing the deformable light guide into depressions which exist between the raised areas. In particular, a locally limited deformation can be achieved by means of the raised areas, as a result of which the accuracy of detecting seat occupancy can be further improved.

Furthermore, at least one light guide is preferably arranged at least partially by means of holding devices, comprising in particular frame-like and/or strip-like systems for holding the light guide. These holding devices are preferably made from plastic and/or metal and serve for additionally stabilizing the optical element against twisting, delocalization and mechanical damage. Seat occupancy detection can thus be achieved with constantly high quality even over a long period of time, despite frequent use of the seat. Frame-like systems may advantageously be round or also angular, preferably square, wherein the geometric shape thereof is preferably based on the geometric structure of the light guide. Furthermore, it is conceivable that these frame-like systems almost completely surround the light guide and has cut-outs on the surface only at particular main stress points of the seat, said cut-outs being directed towards the upper side of the seat. These cut-outs may be either round or angular. Raised areas which match these cut-outs are located on the opposite inner side of the frame-like system, in order in the event of seat occupancy to deform parts of the light guide located therebetween. By virtue of the cut-outs of the frame-like system, the deformation of the light guide takes place at certain points, without the entire light guide being deformed. Furthermore, rail-like systems may also be used as holding devices, wherein the rails in this case are preferably designed as guide rails which guide the light guide at least at one side. Attachment may take place for example by pushing the light guide into the rails, wherein the inner side of the rail-like system facing towards the light guide has mechanical actuation means which, in the event of deformation due to seat occupancy, deform the light guide, and light exits from the light guide, which causes a reduction in the signal. Preferably, the holding devices are located in cut-outs of the seat cushion and/or are arranged between the underside of the seat cushion and the base plate.

Suitable mechanical actuation means and/or suitable deformation means can be provided in various configurations. A structurally simple set-up with regard to a conventional seat can be largely retained in the present case if the mechanical actuation means and/or the deformation means are formed by a base plate of the seat part.

Accordingly, one variant embodiment which is simple in this regard provides that a switching strip for switching the light guide is formed by a corrugated sheet-metal shell or by a corrugated base plate of the seat part. In this case, the base shell or base plate need only be corrugated. The sensitivity of the present detection device can also be adjusted by means of the shape of the corrugation.

If the light guides are arranged between a base plate of the seat part and a seat part surface, a deformable light guide can for example be pushed against a suitably shaped base plate without any problem and in the process can be bent if a person has sat on the seat part surface.

The light guides can also advantageously be integrated in a seat if the light guides are arranged at least partially within a seat cushion of the seat part. In this case, especially a deformable light guide can be passed through the seat cushion, for example as a loop.

With regard to another construction, a deformable light guide can also be arranged below a seat cushion and thus between the seat cushion of a seat part and a base plate of the seat part.

However, the deformable light guide can more advantageously be positioned within the seat cushion, since the deformable light guide within the seat cushion is much better protected against mechanical damage.

In order in particular to be able to bend or kink a deformable light guide using only little force, it is advantageous if the seat part comprises a seat cushion, wherein the seat cushion has cushion material cut-outs, in which raised areas of mechanical actuation means and/or of deformation means for the light guide are arranged.

In order to be able on the one hand to couple light into the inlet side of the deformable light guide and on the other hand to determine light at the outlet side of the deformable light guide, it is advantageous if the detection device comprises a transmitting and/or receiving device, wherein in particular the transmitting device has a light emitter and the receiving device has a light detector. Such a transmitting and/or receiving device can also be provided separately from a detection device of the present seat, as an independent component, wherein then the present light guide must then be suitably positioned relative to such an independent transmitting and/or receiving device.

Further advantages, aims and properties of the present invention will be explained with reference to the drawing appended to the following description, which drawing shows, by way of example, a motor vehicle seat comprising means for optically detecting seat occupancy.

BRIEF DESCRIPTION OF THE DRAWINGS

Preferred and alternative examples of the present invention are described in detail below with reference to the following drawings:

FIG. 6 schematically shows a view of an underside of a further seat cushion with one possible arrangement of a deformable light guide and with one possible arrangement of contact access areas for easier access to the deformable light guide;

FIG. 7 schematically shows a deformable light guide loop with a transmitting and receiving device for light; and FIG. 8 schematically shows a view from below of another seat cushion with an integrated deformable light guide.

DETAILED DESCRIPTION OF THE PREFERRED EMBODIMENT

Figure 1:
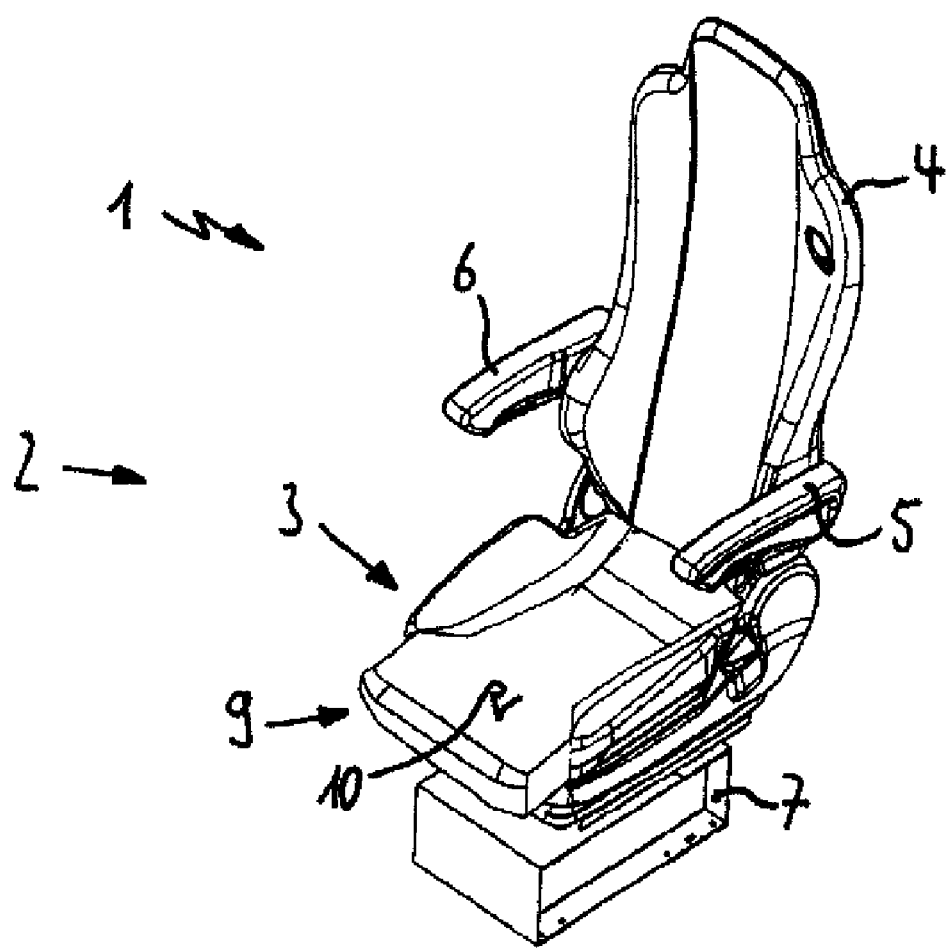
FIG. 1 schematically shows a perspective view of a motor vehicle seat comprising a seat part, a backrest and a detection device associated with the seat part, the detection device comprising means for optically detecting occupancy of the seat by a person.
Figure 2:
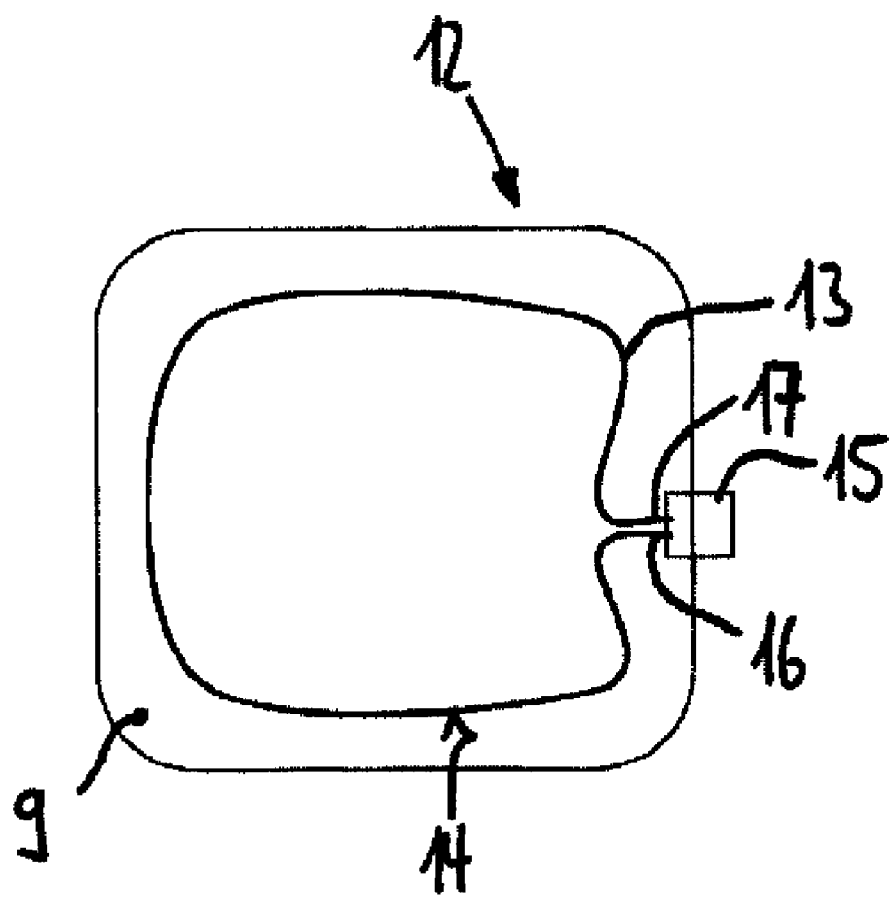
FIG. 2 schematically shows a partially cut-away view of a seat cushion of the seat part of FIG. 1, wherein the light guides are integrated within the seat cushion.

The seat 1 shown in FIG. 1 is a motor vehicle seat 2, as can be used especially in commercial vehicles (not shown here). The seat 1 comprises a seat part 3, a backrest 4 adjoining the seat part 3, and two arm rests 5 and 6. The seat 1 is mounted on a support frame 7 which can be fixedly connected to a passenger compartment floor of the motor vehicle (not shown here).

Figure 4:
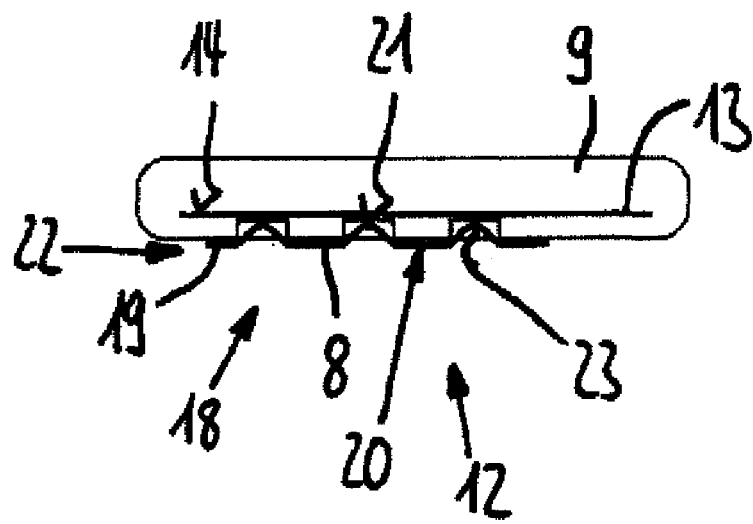
FIG. 4 schematically shows a partially cut-away view of the seat cushion of FIG. 2.
Figure 5:
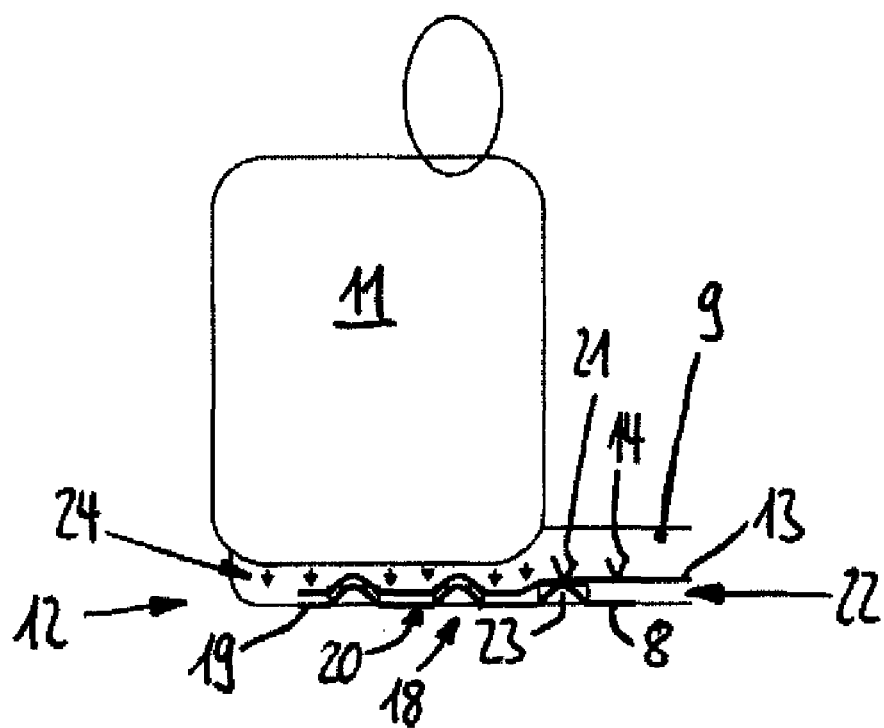
FIG. 5 schematically shows a partially cut-away view of the seat cushion of FIGS. 2 and 5 loaded by a person.

As can be seen in particular from the diagrams in FIGS. 4 and 5, the seat part 3 comprises a base plate 8 on which a seat cushion 9 is applied. By means of the seat part 3 and the seat cushion 9, a comfortable seat surface 10 is formed, on which a person 11, for example a driver of the commercial vehicle (not shown here), can sit.

In order to be able to detect automatically whether the person 11 has actually sat on the seat part 3 of the seat 1 and thus the seat 1 is also occupied by a person, the seat 1 furthermore includes a device 12 for detecting occupancy of the seat by a person.

As can furthermore be seen from the diagrams in FIGS. 2 to 5, the detection device 12 comprises, according to the invention, means 13 for optically detecting occupancy of the seat by a person. In the preferred embodiment, the means 13 is configurable as a deformable light guide 14. Especially by means of the deformable light guide 14, it is possible to detect in a structurally simple and extremely reliable manner whether the seat is occupied. In this embodiment, this is accomplished because as the deformable light guide 14 is deformed by the load of the person 11, the light passed through the deformable light guide 14 is accordingly changed on its way through the deformable light guide 14 according to the principle of undershooting a limit angle of total reflection or also in particular due to absorption. Alternatively, this is accomplished because there is a break in the deformable light guide 14, and as a result the light flow through the deformable light guide 14 is completely interrupted.

In order to generate and detect the light necessary for the deformable light guide 14, the detection device 12 is preferably equipped with a transmitting and receiving device 15. The light is emitted into an inlet 16 of the deformable light guide 14 by means of a transmitting unit of the transmitting and receiving device 15, and the light passed through the deformable light guide 14 is detected at an outlet 17 of the deformable light guide 14 by means of a receiving unit of the transmitting and receiving device 15. Preferably, when the seat is occupied by a person, the light at the inlet 16 and at the outlet 17 can be differentiated in terms of its light quantity and/or its light quality due to deformation of the light guide 14, as a result of which corresponding electric signals can be transmitted by the transmitting and receiving device 15, for example to a downstream evaluation device (not shown here).

In order that the deformable light guide 14 can be appropriately deformed and the conductivity of the deformable light guide 14 can be varied as a result, the detection device 12 also has means 18 for modulating an optical conductivity of the light guide 14.

A sufficiently good deformation of the deformable light guide 14 can be achieved simply by the fact that the seat cushion 9 of the seat part 3 is already deformed to a sufficiently great extent due to loading by the person 11. This brings the sheath and core closer together, which preferably leads to absorption of the energy of the reflected light with a simultaneous loss of intensity. In this case, the seat cushion 9 can form the modulation means 18. This may be the case in particular when the deformable light guide 14 is embedded within the seat cushion 9, as shown in the example of embodiment.

In order to be able to deform the deformable light guide 14 always in a particular reliable manner when the seat is occupied by a person, the detection device 12 is additionally preferably equipped with means 19 for mechanically actuating the light guide 14. In this embodiment, the mechanical actuation means 19 can also be regarded as the means for deforming the light guide 14.

Figure 3A:
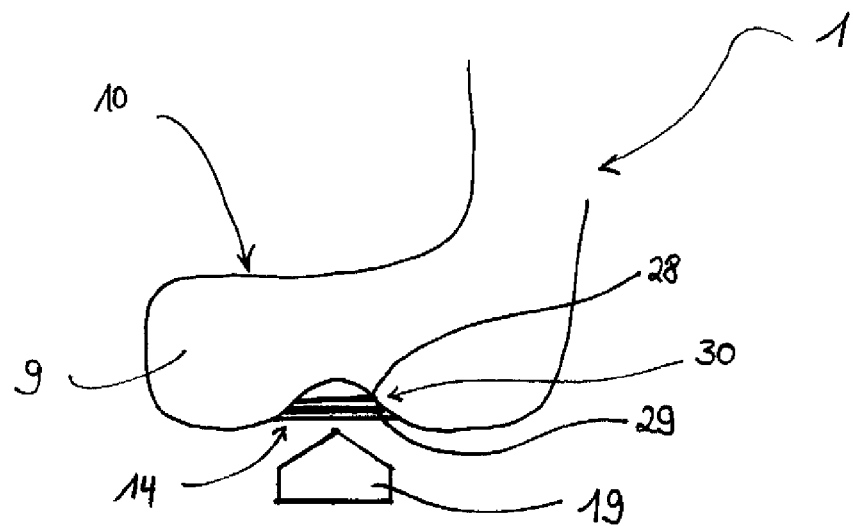
FIGS. 3a and 3b show a schematic side view of a light guide comprising a core element and a sheath used in association with the seat.

FIG. 3a shows a side view of a seat 1 with a seat cushion 9 and a light guide 14 comprising a core element 29 and a sheath 28 surrounding the core element 29. Arranged opposite the cushion material cut-out 30 is a mechanical actuation means 19 which is designed such as to be both stationary but movable and which is at a distance from the light guide 14.

Figure 3B:
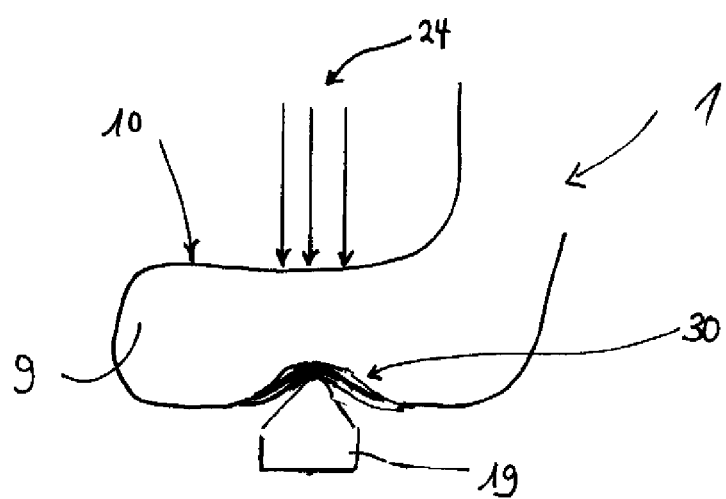

FIG. 3b shows a side view of the seat of FIG. 3a for the case of deformation of the light guide 14 due to seat occupancy, which takes place in the direction of the load arrows 24. In this embodiment, the entire light guide 14, as a result of the seat being occupied, is pushed against the mechanical actuation means 19, which at this moment in time is for example at rest. The core element 29 and the sheath 28 are in this case preferably deformed in such a way that the distance between the core element 29 and the sheath 28 decreases until these are in direct contact. This causes absorption of the energy of the light in the core element 29, which leads to a signal reduction at the outlet 17 of the light guide 14. Reliable information about the seat occupancy is thus provided. Furthermore, in one advantageous example of embodiment, mechanical actuation means 19 can be embodied in a structurally particularly simple manner by means of a corrugated base plate 20, so that advantageously an existing component of the seat 1 can be used.

With further reference to FIGS. 4 and 5, in an alternative embodiment, the corrugated base plate 20 forms raised areas 21 which face towards the light guide 14. A switching strip 22 for switching the deformable light guide 14 is thus provided on the seat part 3 of the seat 1 in a very space-saving manner. Preferably, the raised areas 21 are arranged in the region of cushion material cut-outs 23, so that the raised areas 21 can enter into active contact with the deformable light guide 14 in a particularly effective manner. The deformable light guide 14 can thus be deformed at least partially multiple times or bent around the provided raised areas 21 when the person 11 loads in particular the seat cushion 9 in the direction of the load arrows 24, as a result of which the conductivity of the deformable light guide 14, in particular the conductivity of at least one optical fibre (not shown here) of the deformable light guide 14, can vary.

An underside 125 of another seat cushion 109 is shown in the projection in FIG. 6, on which one possible positioning of a deformable light guide loop 126 is schematically indicated. In this case, corresponding cushion material cut-outs 23 can be provided at four schematically emphasized active areas 127 (numbered only by way of example) (see FIGS. 3 and 4) in order to promote deformation of the deformable light guide loop 126 by a person.

A generic deformable light guide loop 226 is shown by means of FIG. 7. In this example, the deformable light guide loop 226 provides a light guide length of approximately 2 m, wherein an inlet 216 and an outlet 217 of the deformable light guide 214 open into a transmitting and receiving device 215 and are appropriately connected there. Due to the short light guide length of approximately 2 m, an inexpensive step index fibre can be used as the optical fibre (not shown) without any problem.

In the seat cushion 309 shown in FIG. 8, a deformable light guide 314 is already embedded in a meandering manner in the seat cushion 309 and the deformable light guide 314 can be seen directly from outside essentially only at cushion material cut-outs 323. The deformable light guide 314 can therefore be deformed particularly well in the region of the cushion material cut-outs 323. It is also possible to see on the seat cushion 309 a shaped area 330, into which a corresponding base plate of a seat can be placed. In this case, raised areas on the base plate can then reach directly as far as the deformable light guide 314, as a result of which multiple deformation of the light guide 314 can be encouraged, as already described above.

Modifications to the basic concept of this invention are anticipated. By way of example, a so-called switching strip or a plurality of switching strips may be used instead of a deformable light guide. Such switching strips are preferably of elongate shape and have in their interior a switching chamber integrated in their profile. In this case, two conductive regions, which are separate from one another and can be arranged in a strip-like manner one on top of the other, are arranged in such a way that, even with little pressure or with little deformation of the switching strip, the conductive regions come into contact with one another and are thus short-circuited. A signal for a connected evaluation device is produced as a result.

In an alternative embodiment, light guides, such as switching strips, can be positioned in the foam material of a seat surface of a vehicle seat and can be deformed at specific points by shapes in the plate region of the seat surface and associated with electrical contacts made at these points. Such contacting or short-circuit within the switching strip could then take place as a result of the seat surface being occupied.

Such switching strips preferably operate electrically according to the closed circuit principle, i.e. a break in a cable is detected and any risk-causing movement is stopped. Typically, such switching strips operate with a voltage of up to max. 24 V DZ and a current intensity of max. 10 mA. The outside thereof is made from a thermoplastic elastomer with a TPE jacket shaped according to customers' requirements.

A pick-up angle in respect of loads and thus the occurrence of a short-circuit may take place at more than 90° depending on the outer profile shape of the switching strip. The actuation force acting thereon may be 25 N or less. The terminating resistance used is for example 1.2 kΩ and a power of max. 250 mW. A contact resistance may be less than 400Ω.

All of the features disclosed in the application documents are claimed as essential to the invention in so far as they are novel individually or in combination with one another with respect to the prior art. While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A detection device for detecting occupancy of a seat comprising:
    at least one elongate light guide having at least one elongate core element; and
    at least one elongate sheath at a distance from the core element,
    wherein the light guide is deformable by mechanical actuation means in at least one direction running substantially perpendicular to the longitudinal axis of the light guide by deformation brought about by the seat being occupied, and
    wherein the elongate light guide is arranged at least partially in cushion material cut-outs for the light guide of a seat cushion associated with the seat.

2. The detection device according to of claim 1, wherein the elongate light guide is arranged at least partially with the aid of at least one holding frame configured to support the light guide.

3. The detection device according to claim 1, further comprising means for modulating an optical conductivity of the light guide.

4. The detection device according to claim 1, wherein the mechanical actuation means is configured to deform the light guide.

5. The detection device according to claim 4, wherein the mechanical actuation means have raised areas substantially oriented towards the light guide.

6. The detection device according to claim 5, wherein the seat part comprises a seat cushion, wherein the seat cushion has material cut-outs corresponding to raised areas of the mechanical actuation means.

7. The detection device according to claim 4, wherein the mechanical actuation means are formed by at least one of a corrugated base plate or a corrugated sheet-metal shell.

8. The detection device according to claim 1, wherein at least one light guide is arranged between a base plate of the seat part and a seat part surface.

9. The detection device according to claim 1, further comprising at least one of a transmitting or a receiving device, wherein the transmitting device has a light emitter and the receiving device has a light detector.

10. A detection device for detecting occupancy of a seat comprising:
- at least one elongate light guide having at least one elongate core element; and
- at least one elongate sheath at a distance from the core element,
- wherein the light guide is deformable by mechanical actuation means in at least one direction running substantially perpendicular to the longitudinal axis of the light guide by deformation brought about by the seat being occupied,
- wherein the mechanical actuation means is configured to deform the light guide,
- wherein the mechanical actuation means have raised areas substantially oriented towards the light guide,
- wherein the seat part comprises a seat cushion, and
- wherein the seat cushion has material cut-outs corresponding to raised areas of the mechanical actuation means.

* * * * *